United States Patent [19]
Kakuishi

[11] Patent Number: 5,287,406
[45] Date of Patent: Feb. 15, 1994

[54] HYBRID CIRCUIT HAVING A TWO-WIRE/FOUR-WIRE CONVERTING FUNCTION

[75] Inventor: Mitsuo Kakuishi, Yokohama, Japan

[73] Assignee: Fujitsu Limited, Kawasaki, Japan

[21] Appl. No.: 725,838

[22] Filed: Jul. 3, 1991

[30] Foreign Application Priority Data

Jul. 6, 1990 [JP] Japan .................. 2-177339

[51] Int. Cl.[5] ............................................. H04M 9/00
[52] U.S. Cl. ................................... 379/404; 379/402;
379/410; 379/406; 379/405
[58] Field of Search ............... 379/402, 403, 404, 405,
379/409, 410, 411, 406, 407, 408

[56] References Cited

U.S. PATENT DOCUMENTS

| | | |
|---|---|---|
| 4,527,020 | 7/1985 | Ito .................. 379/410 X |
| 4,787,080 | 11/1988 | Yamakido et al. ............ 370/32.1 |

FOREIGN PATENT DOCUMENTS

| | | |
|---|---|---|
| 0315191 | 11/1988 | European Pat. Off. . |
| 168711 | 9/1984 | Japan . |
| 200623 | 8/1988 | Japan . |

Primary Examiner—James L. Dwyer
Assistant Examiner—Paul A. Fournier
Attorney, Agent, or Firm—Staas & Halsey

[57] ABSTRACT

A hybrid circuit includes a two-wire/four-wire conversion unit for forming an interface between a two-wire line and a four-wire line, and a digital balancing unit for canceling a return echo passing through an echo return route including the conversion unit. The digital balancing unit includes first through fourth parts. The first part determines values of elements of a ladder type circuit composed of resistors and capacitors. The ladder type circuit corresponds to an original equivalent circuit having an impedance obtained by viewing the two-wire line from the conversion unit. The second part generates an impedance function of the original equivalent circuit in the form of a z function in accordance with a bilinear transform using an over-sampling frequency. The third part generates filter coefficients of a digital filter by inserting the impedance function into a transfer function of the echo return route. The fourth part generates, from a signal transferred via the signal receiving terminal, an echo cancel signal by the digital filter having the filter coefficients generated by the third part and cancels the return echo by the echo cancel signal.

27 Claims, 8 Drawing Sheets

HYBRID CIRCUIT HAVING A TWO-WIRE/FOUR-WIRE CONVERTING FUNCTION

BACKGROUND OF THE INVENTION

1. Field of Invention

The present invention generally relates to a hybrid circuit having a two-wire/four-wire converting function, and more particularly to a hybrid circuit having a digital balancing circuit.

2. Description of the Related Art

A conventional two-wire PCM channel unit having a two-wire/four-wire converting function includes a power receiving unit, and a power supply unit, which supplies a voltage of −48 V to a terminal. Conventionally, these units are coupled with each other by a hybrid transformer having the two-wire/four-wire converting function.

Figure 1:
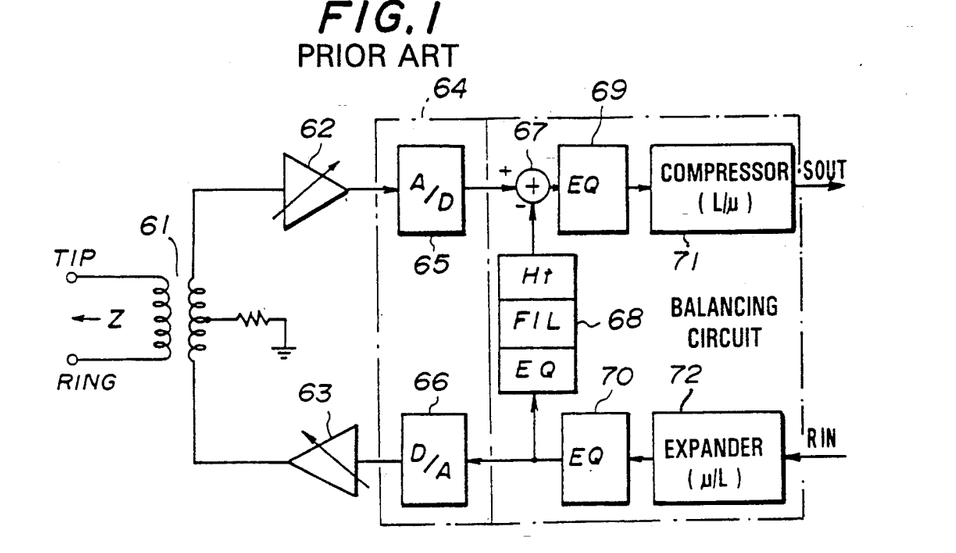
FIG. 1 is a block diagram of a hybrid circuit having a hybrid transformer in a PCM channel unit.

FIG. 1 is a block diagram of a related hybrid circuit in a PCM channel unit using a hybrid transformer. As shown, the PCM channel unit includes terminals TIP and RING for a two-wire line, and signal sending and receiving terminals SOUT and RIN for a four-wire line. Further, the PCM channel unit includes a hybrid transformer 61, rough gain adjustment circuit 62 and 63, conversion block 64, an adder 67, a balancing circuit 68, equalizers 69 and 70, a compressing unit 71, and decompressing (expanding) unit 72. The conversion block 64 is composed of an analog-to-digital (A/D) converter 65, and a digital-to-analog (D/A) converter 66. Each of the equalizers 69 and 70 executes a fine level adjustment procedure and a loss equalizing procedure. The compressing unit (L/μ) 71 converts a linear code L into a compressed code based on the μ-rule, and the expanding unit (μ/L) 72 converts the μ-rule based compressed code into the linear code L. The functions of the elements designated by reference numerals 67–72 are implemented by a digital signal processor.

The compressed code based on the μ rule is input to the expander 72 via the signal receiving terminal RIN. The expander 72 converts the received compressed code into a linear code, which is subjected to the fine level adjustment procedure and the loss equalizing procedure by the equalizer 70. An output signal of the equalizer 70 is input to the D/A converter 66 and the balancing circuit 68. The D/A converter 66 converts the digital signal into an analog signal, which is amplified by the rough gain adjustment circuit 63 and sent out to the two-wire line coupled to the terminals TIP and RING via the hybrid transformer 61.

Meanwhile, an analog signal transmitted via the terminals TIP and RING is input to the A/D converter 65 via the hybrid transformer 61 and the rough gain adjustment circuit 62. Then, the analog signal is converted into a digital signal by the A/D converter 65, and applied to a plus terminal of the adder 67. The balancing circuit 68 outputs a pseudo echo to a minus terminal of the adder 67. Thereby, a return echo contained in the signal from the A/D converter 6 is canceled by the pseudo echo. An output signal of the adder 67 is input, via the equalizer 69, to the compressor 71, which converts the output signal from the adder 67 into the compressed code based on the μ rule. The compressed code is sent out via the terminal SOUT.

The balancing circuit 68 produces a transform characteristic identical to that of an echo return route. The balancing circuit 68 can be realized, together with other functions, by a digital signal processor. An equalizing function (EQ), an interpolation filtering function (FIL), and a transfer function (Ht) of an echo return route are realized by digital processing. It will be noted that the echo return route includes the D/A converter 66, the rough gain adjustment circuit 63, the hybrid transformer 61, the rough gain adjustment circuit 62 and the A/D converter 64, and the return echo passes through these elements in this order. As has been described previously, the adder 67 functions to cancel the return echo by the pseudo echo generated by the balancing circuit 68.

Figure 2:
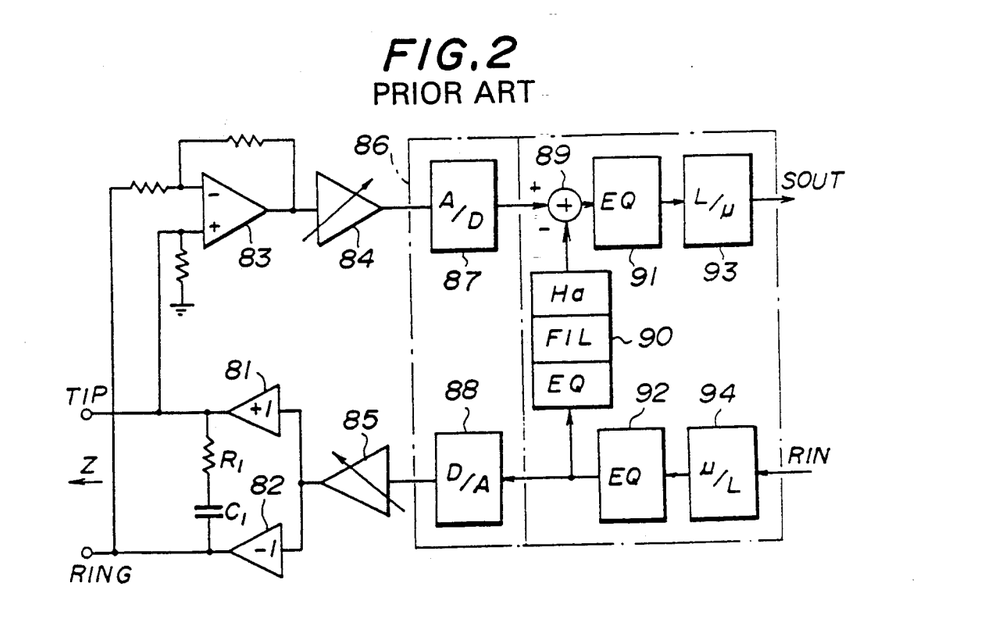
FIG. 2 is a block diagram of a hybrid circuit having an active hybrid circuit in a PCM channel unit.

FIG. 2 is a block diagram of another related hybrid circuit in the PCM channel unit using an active hybrid circuit. The PCM channel unit includes a non-inverting amplifier 81, an inverting amplifier 82, a differential amplifier 83, rough gain adjustment circuits 84 and 85, a conversion circuit 86, an adder 89, a balancing circuit 90, equalizers 91 and 92, a compressor 93, and an expander 94. The conversion circuit 86, which includes an A/D converter 87 and a D/A converter 88, operates in the same way as the conversion circuit 64 shown in FIG. 1. The compressor 93 and the expander 94 function in the same way as the compressor 71 and the expander 72 shown in FIG. 1. Further, the hybrid circuit shown in FIG. 2 includes a resistor R1 and a capacitor C1, both of which form a terminating impedance. Generally, the elements designated by reference numerals 89–94 are realized by a digital signal processor.

The balancing circuit 90 has the equalizing function (EQ) and the interpolation filtering function (FIL) in the same way as the balancing circuit 68 shown in FIG. 1. Further, the balancing circuit 90 has a transfer function (Ha) of an echo return route, which function is different from that of the balancing circuit 68. The echo return route in the configuration shown in FIG. 2 includes the D/A converter 88, the rough gain adjustment circuit 85, the non-inverting amplifier 81 and the inverting amplifier 82, the differential amplifier 83, the rough gain adjustment circuit 84 and the A/D converter 87, and the return echo passes through these elements in this order. The balancing circuit 90 generates a pseudo echo, which is subtracted from the signal from the A/D converter 87, so that the return echo contained in the output from the A/D converter 87 is canceled.

Figure 3:
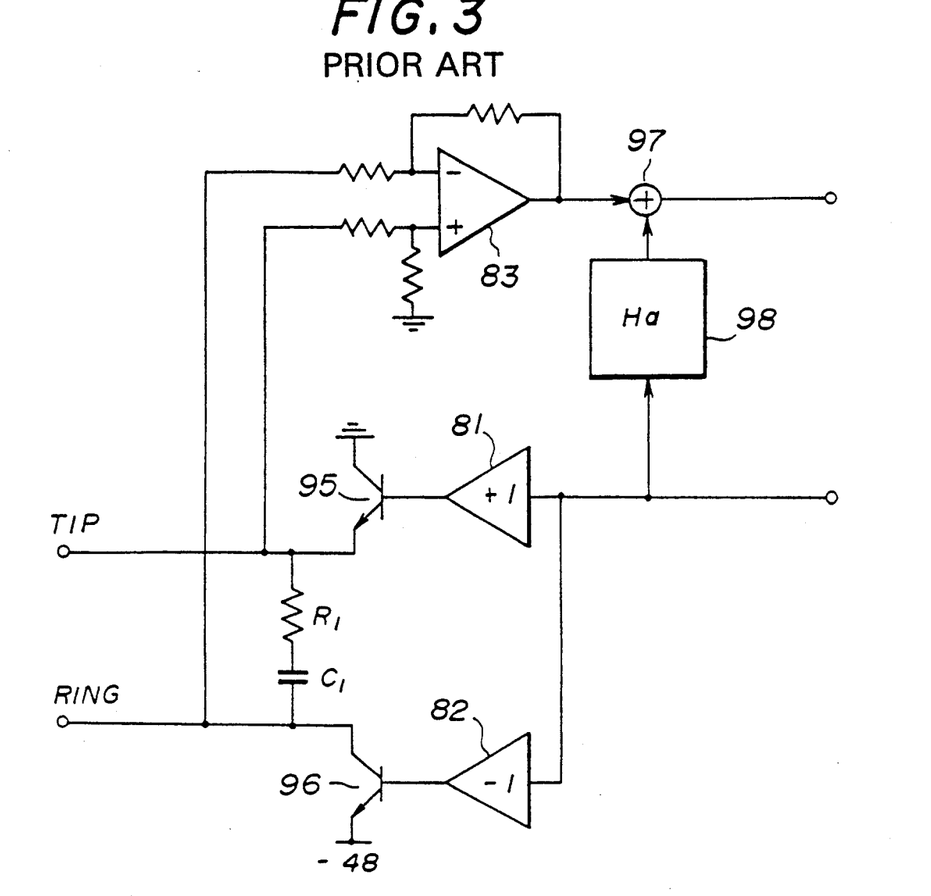
FIG. 3 is a circuit diagram of an active hybrid circuit shown in FIG. 2.

FIG. 3 is a block diagram of the active hybrid circuit shown in FIG. 2. In FIG. 3, those parts which are the same as those shown in FIG. 2 are given the same reference numerals. The active hybrid circuit shown in FIG. 3 includes transistors 95 and 96, an adder 97, and an echo canceller 98. A voltage of −48 V is applied to the terminal RING via the transistor 96, so that electricity is supplied to the two-wire line coupled to the terminals TIP and RING.

The transfer function Ht of the echo return route formed in the hybrid circuit using the hybrid transformer 61 shown in FIG. 1 is expressed as follows:

$$Ht = (\tfrac{1}{2})[(Z - R1)/(Z + R1)] \qquad (1)$$

where Z is an impedance obtained by viewing the two-wire line from the terminals TIP and RING, and R1 is a standard impedance of the hybrid transformer 61, which is twice a resistor connected between an intermediate tap of the hybrid transformer 61 and the system ground.

The transfer function Ha of the echo return route formed in the hybrid circuit using the active hybrid circuit shown in FIGS. 2 and 3 is expressed as follows:

$$Ha = (\alpha \cdot Z \cdot Z')/(Z+Z') \quad (2)$$

where $Z'$ is the impedance of a series circuit consisting of the resistor R1 and the capacitor C1, and $\alpha$ is a constant having the dimension of admittance. It can be seen from the above description that the balancing circuit 90 must be formed in a way different from that of the balancing circuit 68.

Figure 4:
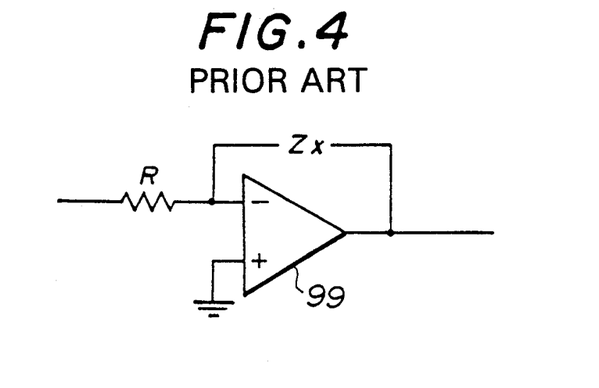
FIG. 4 is a block diagram of a balancing network circuit.

In order to realize a return echo cancelling circuit in the analog domain, a circuit is used which is composed of an operational amplifier, a resistor and a capacitor. FIG. 4 is a circuit diagram of the balancing circuit 90 used for the active hybrid circuit type. An operational amplifier has a non-inverting input terminal which is grounded, and an inverting input terminal which receives an input signal via a resistor R. The impedance between the inverting input terminal of the operational amplifier 99 and an output terminal thereof is indicated by Zx. Thus, the following formulas are obtained taking into account the aforementioned formula (2):

$$Zx = (Z \cdot Z')/(Z+Z')$$

$$R = 1/\alpha.$$

Thus, if the above two formulas stand or are used, it is possible for the adder 97 to cancel the return echo.

Generally, the impedance Z obtained by viewing the two-wire line depends on the length and type of cable. Thus, a plurality of impedance Zx elements are prepared in order to conform to typical types of cable, and are selectively used. The most typical impedance Zx is equal to $Z'/2$, in which $Z'$ is a standard terminating impedance of a system. The impedance Z is equal to the impedance $Z'$ if cables and so on are ideal ones.

A scheme is known in which a circuit for canceling a return echo in the two-wire/four-wire converting means using the hybrid transformer is formed of a digital signal processor (see Alfred Fettweis, "WAVE DIGITAL FILTER: THEORY AND PRACTICE", Proceedings of the IEEE, Vol. 74, No. 2, Feb., 1986, pp. 314, the disclosure of which is hereby incorporated by reference).

Recently, the active hybrid circuit type has been more widely used, and many hybrid transforms which are working tend to be replaced by the active hybrid circuit type. Under such a circumstance, it is required to provide a PCM channel unit in conformity with both the hybrid transformer type and the active hybrid circuit type. In order to meet this requirement, it may be possible to provide two balancing circuits 68 and 90 in the PCM channel unit. However, this increases the size and cost of the PCM channel unit. Further, in the case where the transfer function Ha used in the active hybrid circuit type is realized by only digital signal processing, if a large-amplitude signal is input to the A/D converter 87 of the PCM channel unit, the A/D converter 87 will overflow, so that the output signal of the A/D converter 87 will be distorted.

SUMMARY OF THE INVENTION

It is a general object of the present invention to provide a hybrid circuit in which the above-mentioned disadvantages are eliminated.

A more specific object of the present invention is to provide a simple and less expensive hybrid circuit having a balancing circuit in conformity with both the hybrid transformer type and the active hybrid circuit type.

The above-mentioned objects of the present invention are achieved by a hybrid circuit comprising:

two-wire/four-wire conversion means for forming an interface between a two-wire line and a four-wire line, the four-wire line having a signal receiving terminal and a signal sending terminal; and digital balancing means, operatively coupled to the two-wire/four-wire conversion means, for canceling a return echo passing through an echo return route including the two-wire/four-wire conversion means, the digital balancing means comprising:

first means for determining values of elements of a ladder type circuit composed of resistors and capacitors, the ladder type circuit corresponding to an original equivalent circuit having an impedance obtained by viewing the two-wire line from the two-wire/four-wire conversion means;

second means, operatively coupled to the first means, for generating an impedance function of the original equivalent circuit in the form of a z function in accordance with a bilinear transform using an over-sampling frequency;

third means, operatively coupled to the second means, for generating filter coefficients of a digital filter by inserting the impedance function into a transfer function of the echo return route; and fourth means, which is coupled to the third means and has the digital filter, for generating, from a signal transferred via the signal receiving terminal, an echo cancel signal by the digital filter having the filter coefficients generated by the third means and for canceling the return echo by the echo cancel signal.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 5:
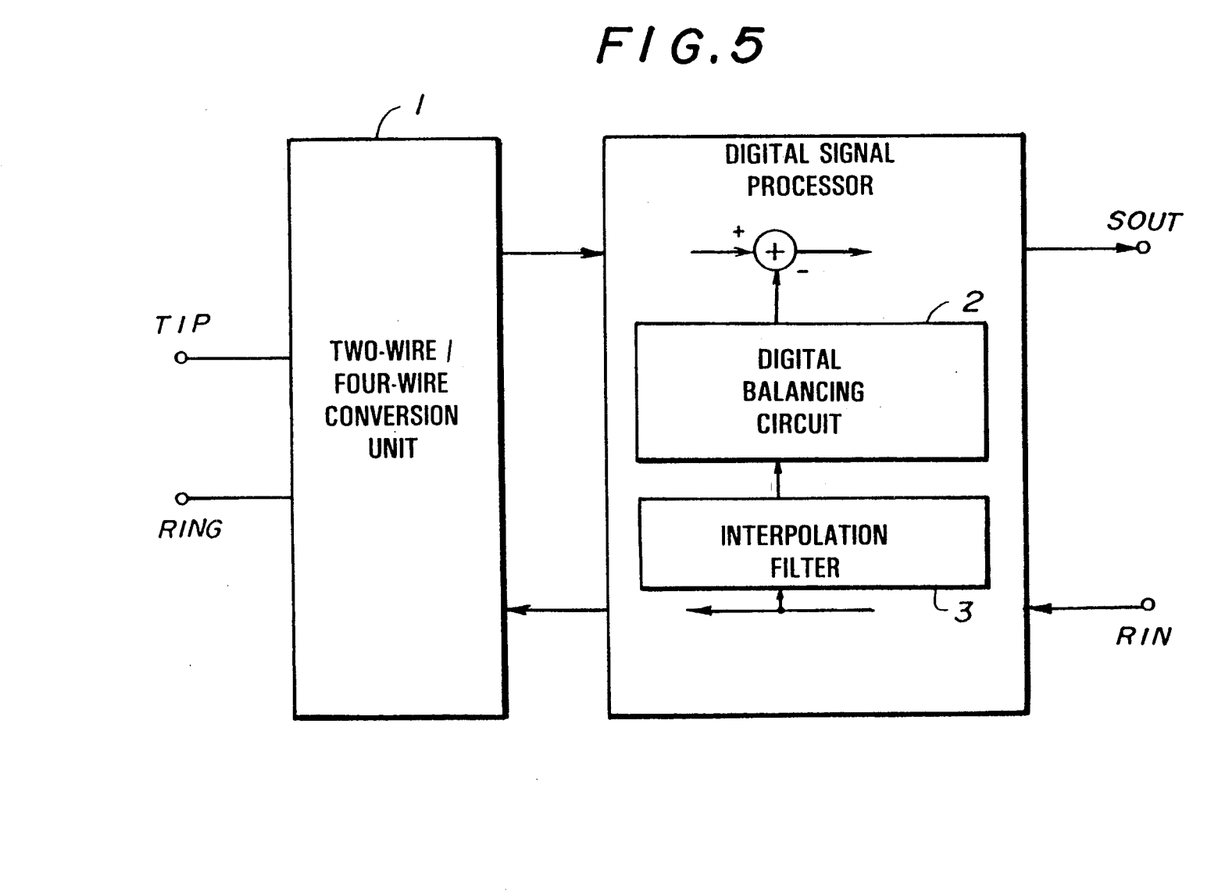
FIG. 5 is a block diagram of an overview of a hybrid circuit of the present invention.

Referring to FIG. 5, the hybrid circuit of the present invention includes a two-wire/four-wire conversion unit 1, a digital balancing circuit 2 and an interpolation filter 3. TIP and RING are terminals for the two-wire line (cable), and SOUT and RIN are respectively signal sending and receiving terminals for the four-wire line (cable). The digital balancing circuit 2, which can be implemented by a digital signal processor, has the first, second and third functions, which will be described below. The first function of the digital balancing circuit 2 determines, on the basis of a cable condition about the two-wire line, the terminating impedance and so on, the values of elements forming a ladder type network composed of a plurality of capacitors and resistors which represent an impedance obtained by viewing the two-wire line from the two-wire/four-wire conversion unit 1. The second function transforms the determined element values into an impedance function of the z function by a bilinear transform. The third function inserts the impedance function into a transfer function in order to generate filter coefficients for the interpolation filter 3. With this arrangement, it is possible to cancel a return echo leaking from the signal receiving terminal RIN of the four-wire line to the signal sending terminal SOUT thereof by the same circuit configuration in common with the hybrid transformer and the active hybrid circuit.

A description will now be given of a first preferred embodiment of the present invention with reference to FIG. 6. The configuration shown in FIG. 6 includes a hybrid transformer 11, rough gain adjustment circuits 12 and 13, a conversion circuit 14, an A/D converter 15, a D/A converter 16, an adder 17, a flat gain operation unit 18, a digital balancing circuit 19, an interpolation filter operation unit 20, a hybrid transformer coefficient calculating unit 21, an active hybrid circuit coefficient calculating unit 22, an interpolation filter coefficient selecting unit 23, a selector 24, an impedance function operating unit 25, an element value setting unit 26, two equalizers 27 and 28, a compressor 29 and an expander 30. Further, the configuration shown in FIG. 6 includes the terminals TIP and RING for the two-wire line, and signal sending and receiving terminals SOUT and RIN for the four-wire line. The above structural elements designated by reference numerals 17–30 can be realized by a digital signal processing circuit, such as a digital signal processor.

Figure 6:
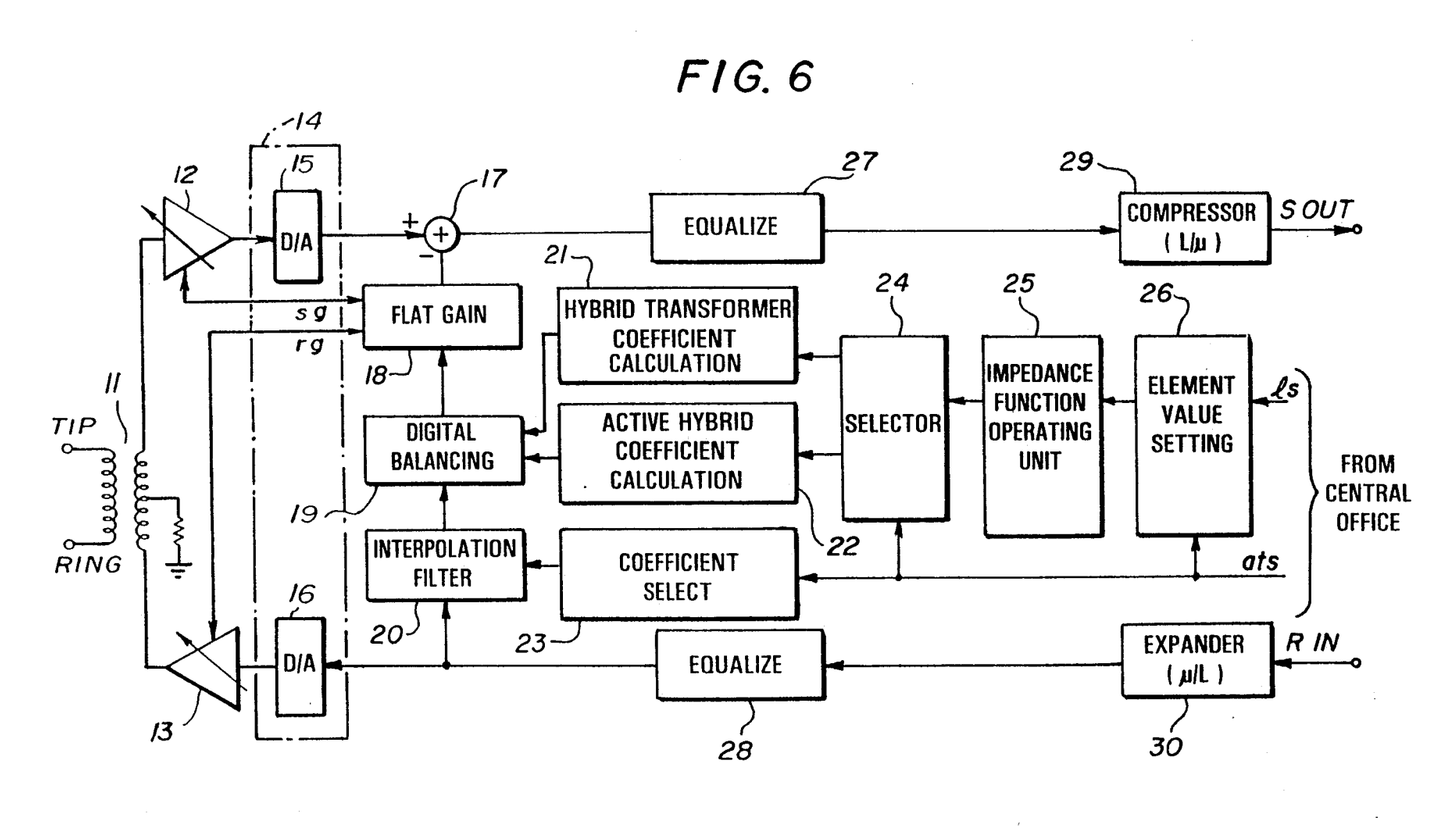
FIG. 6 is a block diagram of a first preferred embodiment of the present invention.

The embodiment shown in FIG. 6 uses a hybrid transformer 11 which forms a two-wire/four-wire conversion circuit. The two-wire line is connected to the terminals TIP and RING. Line information (ls) and discrimination information (ats) are input to the element value setting unit 26 from a central office (not shown for the sake of simplicity) in a PCM system. The line information ls indicates a cable condition such as the length and type of the two-wire line (cable), and a line (cable) terminating impedance. The discrimination information ats indicates the type of the hybrid circuit (that is, whether the hybrid transformer type or the active hybrid circuit type is used). The element value setting unit 26 determines the values of elements which form a circuit shown in FIG. 8. The element values determined by the element value setting unit 26 are input to the impedance function operating unit 25. The discrimination information ats is also input to the selector 24 and the coefficient selecting unit 23.

Information sg roughly indicating a signal sending gain and information rg roughly indicating a signal receiving gain are input to the rough gain adjustment circuits 12 and 13, respectively, and to the flat gain operating unit 18. The information sg and rg are used for controlling the gains of the circuits 12 and 13, respectively. The flat gain operating unit 18 controls the gain of a signal applied to the minus terminal of the adder 17 on the basis of the information sg and rg. The information sg and rg are generated by the digital signal processor which forms the operation units and coefficient calculating units shown in FIG. 6. The routes through which the information sg and rg are transmitted are simply depicted for the sake of simplicity.

Figure 7:
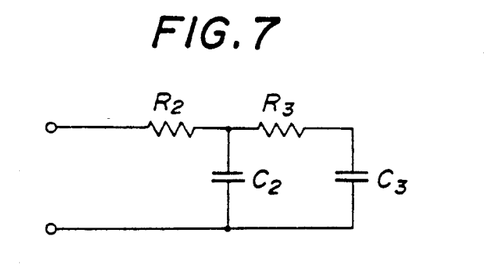
FIG. 7 is a circuit diagram of an impedance approximation circuit used with a hybrid transformer employed.

When the hybrid transformer 11 is used as the two-wire/four-wire conversion circuit, an equivalent circuit obtained by viewing the two-wire line side from the terminals TIP and RING is a ladder circuit which includes resistors R2 and R3 and capacitors C2 and C3 like an impedance approximation circuit shown in FIG. 7. The equivalent circuit based on such an impedance approximation circuit has a fixed element value such that C3=2.16 μF. The other elements C2 and the resistors R2 and R3 depend on the cable condition, such as the cable length and cable type. However, the impedance approximation circuit substantially shows the impedance of a pair cable having a remote end which is terminated by an impedance equal to 600Ω+2.16 μF or 900Ω+2.16 μF.

Figure 8:
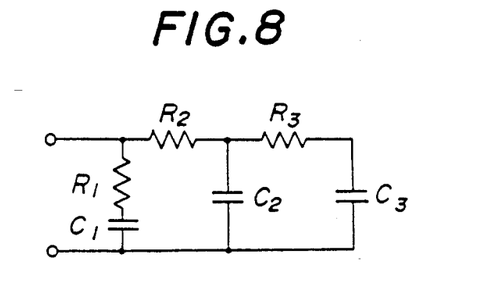
FIG. 8 is a circuit diagram of an impedance approximation circuit used with an active hybrid circuit employed.

Meanwhile, the balancing circuit used with the active hybrid circuit employed corresponds to an impedance approximation circuit shown in FIG. 8, which shows Z·Z'/(Z+Z'). That is, the balancing circuit corresponds to a circuit obtained by adding a resistor R1 and a capacitor C1 to the circuit shown in FIG. 7. Thus, the ladder-type circuit shown in FIG. 8 is used as the original equivalent circuit, and the resistor R1 is set to be infinite or the capacitor C1 is set to be zero when the hybrid transformer is used. As a result, it is possible to use the equivalent circuit shown in FIG. 8 as a common equivalent circuit in common to the case where the hybrid transformer is used and the case where the active hybrid circuit is used.

The two-terminal impedance of the circuit shown in FIG. 8 can be obtained as follows:

$$Z(s) = (A \cdot s^3 + B \cdot s^2 + C \cdot s + D)/(s^3 + E \cdot s^2 + F \cdot s) \quad (3)$$

where:
A = (R1·R2)/(R1+R2)
B = (C2·C3·R2·R3)/[C1·C2·C3(R1+R2)R3] + [C2·R2+C3·R2+C3·R3)C1·R1]/[C1·C2·C3(R1+R2)R3]
C = [C1·R1+C2·R2+C3·R2+C3·R3]/[C1·C2·C3(R1+R2)R3]
D = 1/[C1·C2·C3(R1+R2)R3]
E = [(C1+C2)C3·R3]/[C1·C2·C3(R1+R2)R3] + [C1·(C2+C3)(R1+R2)]/[C1·C2·C3(R1+R2)R3]
F = (C1+C2+C3)/[C1·C2·C3(R1+R2)R3]
s = jω

The above-mentioned formula (3) is transformed into the z function by a bilinear transform defined by the following transform formula (4). In this case, the frequency range of an audio signal is between 300 Hz and 3400 Hz, and the sampling frequency is determined to be 32 kHz which is four times the basic sampling frequency equal to 8 kHz in order to match the impedance characteristic in the z domain with that in the s domain with respect to the same frequency. That is, the bilinear transform at the over-sampling frequency is carried out. Thus, the transform formula is as follows:

$$S = [2/T][(1-z^{-1})/(1+z^{-1})] \qquad (4)$$

where $T = 1/32$ kHz, and $z^{-1} = \exp(-j\omega T)$.

It is necessary to provide, at the previous stage of the balancing circuit, an interpolation filter for converting the signal at intervals equal to 8 kHz to a signal at intervals equal to 32 kHz. For this requirement, the coefficient selecting unit 23 and the interpolation filter operating unit 20 are provided.

An impedance obtained by the z transform, $Ia(z^{-1})$, is written as follows:

$$Ia(z^{-1}) = (a + b \cdot z^{-1} + c \cdot z^{-2} + d \cdot z^{-3})/(1 + e \cdot z^{-1} + f \cdot z^{-2} + g \cdot z^{-3}) \qquad (5)$$

where:
$a = (8A + 4BT + 2CT^2 + DT^3)/(8 + 4ET + 2FT^2)$
$b = (-24A - 4BT + 2CT^2 + 3DT^3)/(8 + 4ET + 2FT^2)$
$c = (24A - 4BT + 2CT^2 + 3DT^3)/(8 + 4ET + 2FT^2)$
$d = (-8A + 4BT - 2CT^2 + DT^3)/(8 + 4ET + 2FT^2)$
$e = (-24 - 4ET'2FT^2)/(8 + 4ET + 2FT^2)$
$f = (24 - 4ET - 2FT^2)/(8 + 4ET + 2FT^2)$
$g = (-8 - 4ET + 2FT^2)/(8 + 4ET + 2FT^2)$ Since the formula (5) is obtained by subjecting the impedance $Z \cdot Z'/(Z+Z')$ to the z transform procedure, the following is obtained by inserting the formula (5) into the formula (2):

$$Ha(z^{-1}) = \alpha \cdot Ia(z^{-1}) = (A0 + A1 \cdot z^{-1} + A2 \cdot z^{-2} + A3 \cdot z^{-3})/(1 + B1 \cdot z^{-1} + B2 \cdot z^{-2} + B3 \cdot z^{-3}) \qquad (6)$$

where $A0 = \alpha \cdot a$, $A1 = \alpha \cdot b$, $A2 = \alpha \cdot c$, $A3 = \alpha \cdot d$, $B1 = e$, $B2 = f$ and $B3 = g$.

Figure 9:
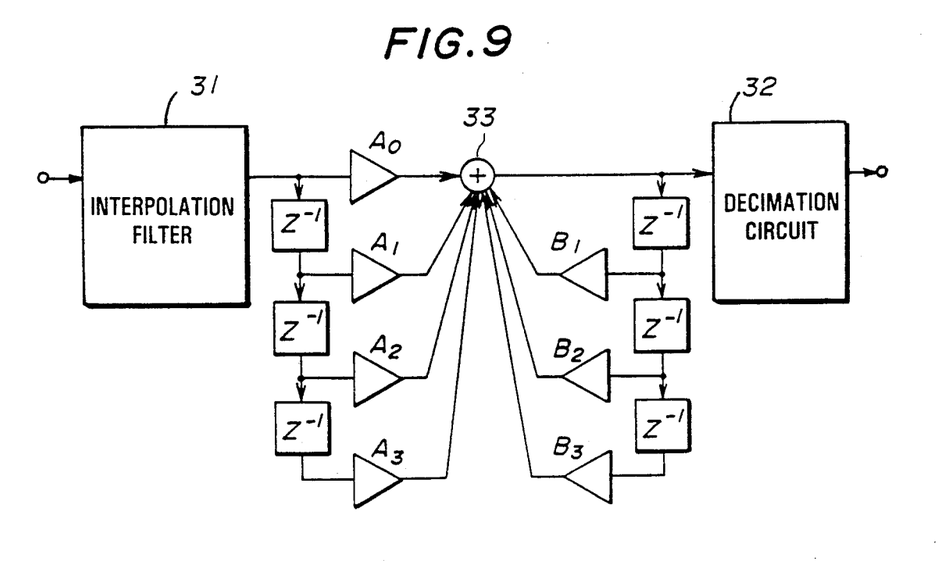
FIG. 9 is a block diagram of a digital balancing circuit.

The formula (6) is obtained, as the digital balancing circuit used with the active hybrid circuit employed, by transforming the CR ladder type circuit in the analog domain shown in FIG. 8 into the Z transform function of $z^{-1}$, and can be realized by a circuit shown in FIG. 9.

The circuit shown in FIG. 9 includes an interpolation filter, a decimation circuit 32, an adder 33 and multipliers A0-A3 and B1-B3, which multiply respective input signals by coefficients A0-A3 and B1-B3 in the formula (6). It will be noted that $z^{-1}$ denotes a delay element having one sampling period. The interpolation filter 31 transforms a train of signals at intervals equal to 8 kHz into a train of over-sampling signals at intervals equal to 32 kHz. The output signals of the interpolation filter 31 are output at intervals equal to 32 kHz. The decimation circuit 32 selects one signal from the adder 33 each time four consecutive signals are output from the adder 33. Thus, a train of signals obtained by the 8 kHz sampling is output by the decimation circuit 32.

The balancing circuit used with the hybrid transformer 11 employed corresponds to the impedance approximation circuit shown in FIG. 7. However, as has been described previously, in the present embodiment, the impedance approximation circuit shown in FIG. 8 is used as the standard circuit. Thus, the balancing circuit in the case being considered is obtained by setting the resistance R1 to be infinite. The impedance in this case is Z(s) defined by the formula (3), and the $z^{-1}$ function thereof is expressed by $Ia(z^{-1})$ defined by the formula (5). By changing the formula (1), assuming that the formula (5) is considered as Z in the formula (1), the following formula is obtained:

$$Ht(z^{-1}) = (\tfrac{1}{2})[(Ia(z^{-1}) - R1)/(Ia(z^{-1}) + R1)].$$

Thus, $$Ht(z^{-1}) = (A0 + A1 \cdot z^{-1} + A2 \cdot z^{-2} + A3 \cdot z^{-3})/(1 + B1 \cdot z^{-1} + B2 \cdot z^{-2} + B3 \cdot z^{-3}) \qquad (7)$$

where:
$k = 1/[1 + (a/R1)]$
$A0 = (k/4)[(a/R1) - 1]$
$A1 = (k/4)[(b/R1) - e]$
$A2 = (k/4)[(c/R1) - f]$
$A3 = (k/4)[(d/R1) - g]$
$B1 = k[(b/R1) + e]$
$B2 = k[(c/R1) + f]$
$B3 = k[(d/R1) + g]$.

As has been described previously, by transforming the CR ladder type circuit shown in FIG. 8 into the $z^{-1}$ function, it is possible to realize the function of the digital balancing circuit for the hybrid transformer type, and realize the balancing circuit having the transfer function defined by the formula (7) on the basis of the circuit shown in FIG. 8 in the same way as the balancing circuit used with the active hybrid circuit employed.

As has been set forth previously with respect to FIG. 6, the discrimination information ats, which indicates whether the hybrid transformer type or the active hybrid circuit type is used, is input to the element value setting unit 26, to which the line information ls is also input. The element value setting unit 26 determines the element values based on the received information. The impedance function operating unit 25 transforms the original equivalent circuit into the impedance function of the z domain by the bilinear transform using the over-sampling frequency. The selector 24 selects either the hybrid transformer coefficient calculating unit 21 or the active hybrid circuit coefficient calculating unit 22, so that the filter coefficients of the digital balancing circuit are calculated by the selected unit. The filter coefficients are then output to the digital balancing unit 19. The signal received via the signal receiving terminal RIN of the four-wire line is input to the digital balancing unit 19 via the interpolation filter 20, so that an output signal based on the transfer function of the echo return route can be obtained. The output signal thus obtained passes through the flat gain operation unit 18, and is input to the adder 17, so that the return echo contained in the signal applied to the plus terminal of the adder 17 is canceled by the output signal from the flat gain operation unit 18.

In the case where the hybrid transformer 11 is used, the return echo is suppressed to a certain extent due to the function of resistance R1/2, where R1 is shown in FIG. 8. Thus, it is enough to suppress residual components of the return echo by Ht. Thus, the input signal of the A/D converter 15 has an amplitude smaller than that of the input signal applied to the terminal RIN. With this arrangement, it is possible to effectively prevent the A/D converter 15 from having an overload. However, a problem would occur in the case where the active hybrid circuit is employed because a return echo transmitted via the active hybrid circuit is not suppressed at all. In this case, the A/D converter 15 would have an overload.

The second embodiment of the present invention is intended to overcome the above-mentioned problem. A description will now be given of the second embodiment of the present invention with reference to FIG. 10. The configuration shown in FIG. 10 includes a series circuit consisting of resistor R1 and capacitor C1 and forming a terminating impedance, two transistors 41 and 42, a non-inverting amplifier 43, an inverting amplifier 44, a differential amplifier 45, an adder 46, and rough gain adjustment circuits 47 and 48. Further, the configuration shown in FIG. 10 includes a bypass circuit having a fixed gain 49 (the transfer function thereof is equal to, for example, $\alpha \cdot R1/2$), a conversion unit 50, an adder 53, a digital balancing circuit 54, an interpolation filter 55, equalizers 56 and 57, a compressor 58 and an expander 59. The conversion unit 50 is composed of an A/D converter 51 and a D/A converter 52.

Figure 10:
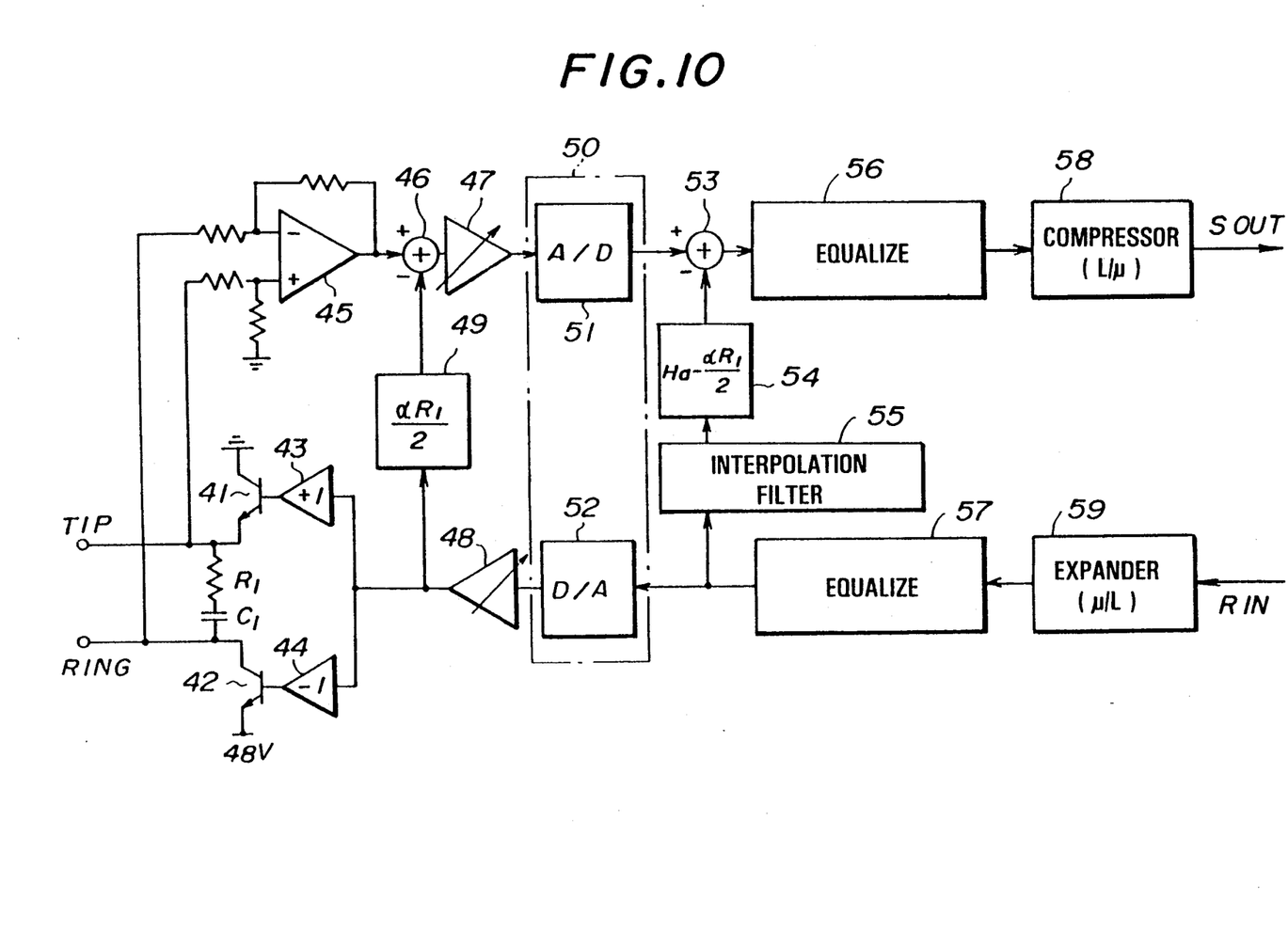
FIG. 10 is a block diagram of a second preferred embodiment of the present invention.

The active hybrid circuit is almost the same as that shown in FIG. 2. In addition, a means for preventing the A/D converter 51 from having an overload is provided. Such a means is formed by the bypass circuit 49 having the fixed gain. The received signal input via the terminal RIN partially passes through the bypass circuit 49, and is input to the minus terminal of the adder 46, so that it is subtracted from the return echo. Since the return echo is partially canceled, the rest of the return echo is canceled by the digital balancing circuit 54.

The bypass circuit 49 has a gain within a certain range. Assuming that the sum of the gains of the rough gain adjustment circuit 47 and the A/D converter 51 is 1 and the sum of the gains of the rough gain adjustment circuit 48 and the D/A converter 52 is also 1, the optimal value of the bypass circuit 49 corresponds to a gain from the four-wire line input side of the active hybrid circuit to the four-wire line output side thereof obtained when the terminals TIP and RING are terminated by the standard impedance realized by the series circuit consisting of or including the resistor R1 and the capacitor C1. The above gain increases in a low-frequency range due to the capacitor C1, while the capacitor C1 is negligible in a high-frequency range since the capacitor C1 has a large capacitance equal to, for example 2.16 $\mu$F. Thus, the gain of the bypass circuit 49 corresponds to $\alpha \cdot R1/2$ obtained when the terminals TIP and RING are terminated by the series circuit consisting of the resistor R1 and the capacitor C1 and the impedance of the capacitor C1 is negligible.

The bypass circuit 49 roughly cancels the return echo, and the transfer function of the digital balancing circuit 54, $Ha'(z^{-1})$, is defined by the following formula (8):

$$Ha'(z^{-1}) = Ha(z^{-1}) - \alpha R1/2 = (A0 + A1 \cdot z^{-1} + A2 \cdot z^{-2} + \quad (8)$$
$$A3 \cdot z^{-3})/(1 + B1 \cdot z^{-1} + B2 \cdot z^{-2} + B3 \cdot z^{-3})$$

where:
A0 = $\alpha$[a−(R1/2)]
A1 = $\alpha$[b−(R1·e)/2]
A2 = $\alpha$[c−(R1·f)/2]
A3 = $\alpha$[d−(R1·g)/2]
B1 = e
B2 = f
B3 = g.

Here, the letters a–g have been previously defined in connection with formula (5) above. The above-mentioned embodiment of the present invention will now be described in short or briefly. First, the values of the elements of the original equivalent circuit shown in FIG. 8 are determined based on the cable condition such as the cable length and cable type as well as the cable terminating impedance. Since the resistance R1 and the capacitance C1 present the standard impedance, they are known. It will be noted that the resistance R1 is set infinite when the hybrid transformer 11 is employed. After the element values regarding the original equivalent circuit are determined, the coefficients A, B, C, D, E and F are calculated using the formula (3).

Second, the function of $z^{-1}$ is obtained by using the formula (5). That is, the coefficients a, b, c, d, e, f and g are calculated based on the coefficients A–F and T = 1/32000 (sampling period). Third, the coefficients A0, A1, A2, A3, B1, B2 and B3 are calculated by using the formula (7) with the hybrid transformer used or the formula (8) with the active hybrid circuit used. By the above-mentioned procedure, it is possible to obtain the coefficients of the transfer function of the digital balancing circuit. The above-mentioned procedure can be carried out at an initial stage of operating the PCM channel unit, and the load of the digital signal processor does not increase. Control or input data used for the above-mentioned procedure are the values of elements R1, R2, R3, C1, C2 C3. Particularly, since C1 is fixed to 2.16 $\mu$F, it is not necessary to input the capacitance C1, so that it is possible to reduce the amount of control or input data used for the aforementioned procedure. Since the resistance R1 is 600 ohms, 900 ohms or infinite, it is possible to input the resistance value R1 by inputting a corresponding identification number, such as 1, 2 or 3. The resistance R1 is set infinite when the hybrid transformer 11 is used. Thus, it is possible to determine whether the formula (7) or formula (8) should be used. That is, it is possible to control the selector 24 by using the discrimination information ats.

In general, assuming that the impedance function in the form of the z function, $It(z^{-1})$, is as follows when the hybrid transformer 11 is used:

$$It(z^{-1}) = (a0 + a1 \cdot z^{-1} + a2 \cdot z^{-2} + \ldots +$$
$$am \cdot z^{-m})/(1 + b1 \cdot z^{-1} + b2 \cdot z^{-2} + \ldots + bm \cdot z^{-m});$$

the following filter coefficients are calculated:

A0 = (k/4)[(a0/R1) − 1]
A1 = (k/4)[(a1/R1) − b1]
A2 = (k/4)[(a2/R1) − b2]
.
.
.
Am = (k/4)[(am/R1) − bm]
B1 = k[(a1/R1) + b1]
B2 = k[(a2/R1) + b2]
.
.
.
Bm = k[(am/R1) + bm]
k = 1/[1 + (a0/R1)]

In this case, the digital filter of the digital balancing circuit 19 (FIG. 6) has a transfer function $Ht(z^{-1})$ as defined by:

$$Ht(z^{-1}) = (A0 + A1 \cdot z^{-1} + A2 \cdot z^{-2} + \ldots +$$

-continued $$Am \cdot z^{-m})/(1 + B1 \cdot z^{-1} + B2 \cdot z^{-2} + \ldots + Bm \cdot z^{-m}).$$

Meanwhile, in the case where the active hybrid circuit is used, the following filter coefficients are calculated:

$$A0 = \alpha \cdot a0$$
$$A1 = \alpha \cdot a1$$
$$A2 = \alpha \cdot a2$$
$$\cdot$$
$$\cdot$$
$$\cdot$$
$$Am = \alpha \cdot am$$
$$k = 1/[1 + (a0/R1)]$$

The digital filter of the digital balancing circuit 54 (FIG. 10) has a transfer function $Ht(z^{-1})$ as defined by:

$$Ht(z^{-1}) = (A0 + A1 \cdot z^{-1} + A2 \cdot z^{-2} + \ldots +$$
$$Am \cdot z^{-m})/(1 + b1 \cdot z^{-1} + b2 \cdot z^{-2} + \ldots + bm \cdot z^{-m}).$$

The echo return route includes the A/D converter, the D/A converter and the rough gain adjustment circuits. It is necessary for the digital balancing circuit to have the amplitude and phase characteristics identical to those of the elements. It is also necessary to change the amplitude of Ht or Ha because the gain of the echo return route changes when the rough gain changes. For example, regarding the configuration shown in FIG. 6, the digital balancing circuit 19 must have a gain equal to $\beta \cdot Ht$ or $\beta \cdot Ha$ where $\beta$ is the product of the gains of the rough gain adjustment 12, the A/D converter 15, the D/A converter 16 and the rough gain adjustment circuit 13. Further, since $\beta$ varies depending on the setting of the gains of the rough gain adjustment circuits 12 and 13, the setting thereof can be carried out by digital signal processing, and the setting information sg and rg obtained by the digital signal processing is used for controlling the circuits 12 and 13 as well as the flat gain operation unit 18.

Regarding the frequency characteristic showing a change in the amplitude with frequency, it is necessary to consider a loss characteristic of a filter contained in the D/A converter in a signal range for compensating for an aperture effect. Such a loss characteristic shows that the amplitude decreases as the frequency increases. Further, it is necessary to compensate for the degradation of the phase characteristic, since filters provided on the analog sides of the A/D and D/A converters 15 and 16 cause a delay distortion. For the above-mentioned requirements, the amplitude and phase characteristics of the interpolation filter 20 near a bandpass range are designed to match with those of the structural elements in the echo return route other than the hybrid transformer 11 or the active hybrid circuit. With this arrangement, it is possible to omit an amplitude equalizer and a phase equalizer.

In order to generate interpolated data, the interpolation filter 20 must be a bandpass or lowpass filter which operates in a frequency four times the sampling frequency equal to 8 kHz. This is attained by matching the attenuation characteristic of such a filter around a cutoff frequency thereof with a composite characteristic of the filters included in the A/D converter 15 and the D/A converter 16.

Figure 11:
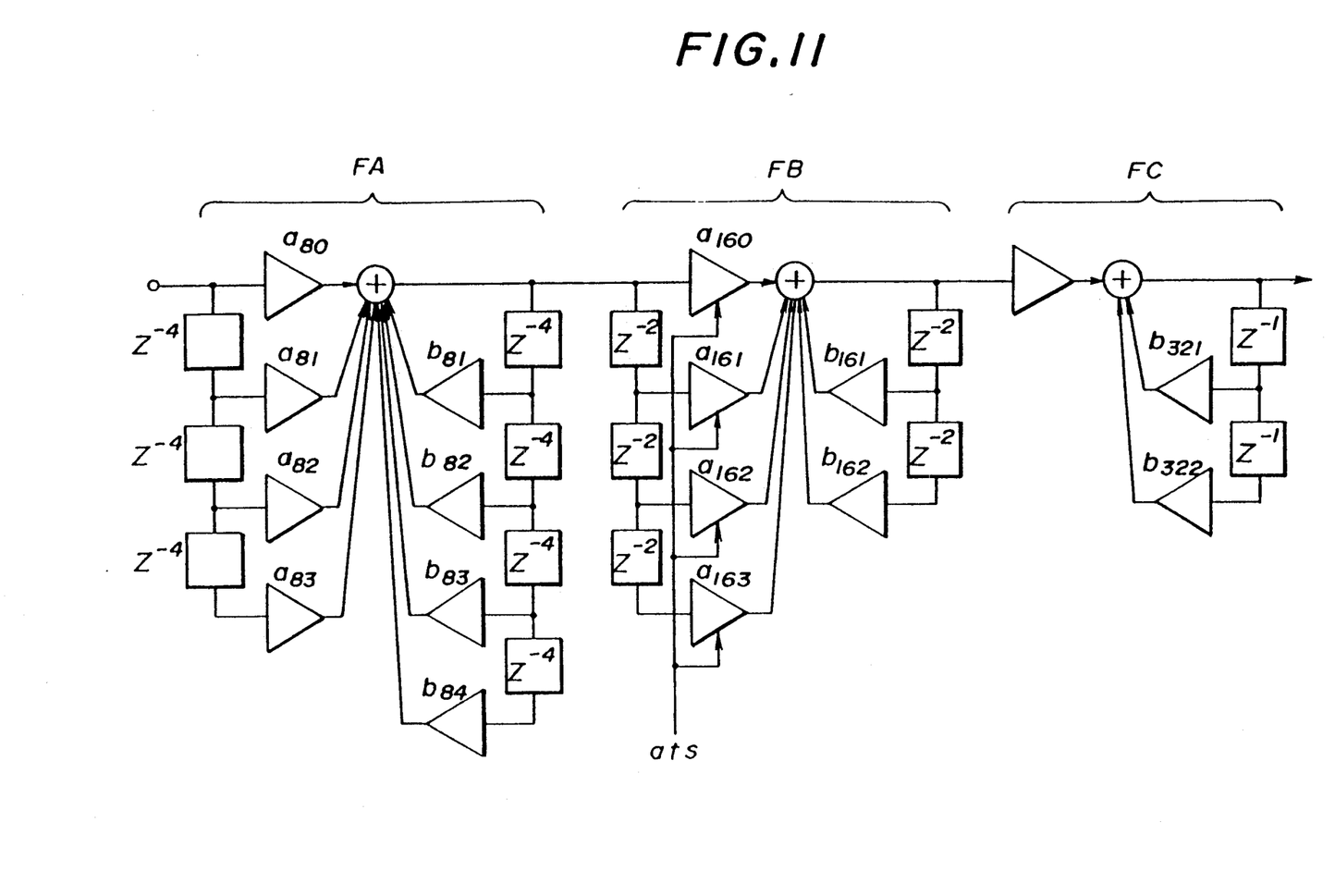
FIG. 11 is a block diagram of an interpolation filter used in the configuration shown in FIG. 10.
Figure 12:
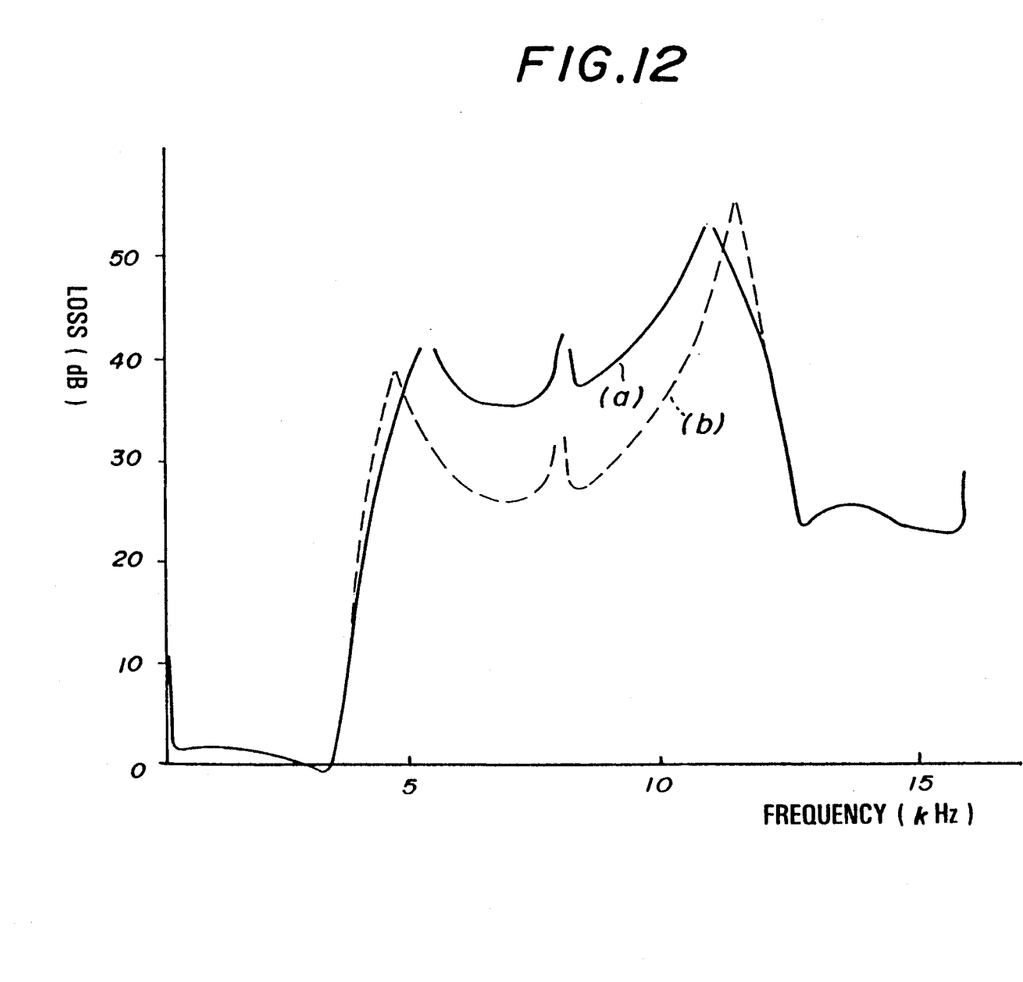
FIG. 12 is a graph of a loss characteristic of the interpolation filter shown in FIG. 10.

FIG. 11 is a block diagram of the interpolation filter 20 shown in FIG. 6, and FIG. 12 is a graph of the loss characteristic of the interpolation filter 20. Solid line (a) shown in FIG. 12 relates to the case where the active hybrid circuit is used, and dotted line (b) relates to the case where the hybrid transformer 11 is used. The interpolation filter 20 is composed of an 8 kHz sampling unit FA, a 16 kHz sampling unit FB and a 32 kHz sampling unit FC. References a80–a83 and b81–b84 are coefficients of multipliers of the 8 kHz sampling unit FA. References a160–a163, b161 and b162 are coefficients of multipliers of the 16 kHz sampling unit FB. References b321 and b322 are coefficients of multipliers of the 32 kHz sampling unit FC. The coefficients a160–a163 of the 16 kHz sampling unit FB are changed based on the discrimination information ats showing whether the hybrid transformer or the active hybrid circuit is used. For example, each of the multipliers a160–a163 has a plurality of values of the corresponding coefficient, and one of them is selected. Alternatively, a plurality of multipliers having different values of the coefficients a160–a163 are provided in the respective triangular blocks of the multipliers, and one of them is selected for each of the respective blocks.

As shown in FIG. 12, the interpolation filter 20 has the zero-point of the transfer function in a low frequency range lower than 100 Hz. This is due to the fact that the filter provided on the analog side of the A/D converter functions as a bandpass filter, which has a sharp phase characteristic in a range between 300 Hz and 500 Hz. If the interpolation filter is not the bandpass filter but a lowpass filter, it is impossible to obtain a phase characteristic almost the same as that of the echo return route. The loss characteristic in the bandpass range, which shows a decrease in the level with an increase in the frequency, is designed to make it possible for the D/A converter on the analog side of the D/A converter to compensate for the aperture effect.

It will be noted that the absolute delay amount with the hybrid transformer 11 used is different from that with the active hybrid circuit used. More specifically, it is considered that use of the active hybrid circuit needs an increased number of operational amplifiers and causes an absolute delay amount greater than that for use of the hybrid transformer. By changing the coefficients of the interpolation filter 20, it is possible to compensate for the difference (for example, 12.5 $\mu$s) between the absolute delay times without changing the loss characteristic in the bandpass range. As a result, it is not necessary to prepare for different interpolation filters, so that a phase equalizer for compensating for the difference between the absolute delay times. In this case, it is possible to prepare for two different coefficient units like the coefficient selector 23 shown in FIG. 6 and select one of them by the discrimination information ats. It is also possible to use a digital filter having substantially fixed coefficients and change some of the fixed coefficients by the discrimination information ats because the interpolation filter 20 is independent of the line information such as the cable length.

The present invention uses only a small number of parameters such as the cable length and cable type. More specifically, only three parameters (R2, R3 and C2 shown in FIG. 8) are substantially used for the CR ladder type circuit. The $z^{-1}$ transfer function of the circuit shown in FIG. 8 uses seven parameters A0, A1, A2, A3, B1, B2 and B3. Assuming that 240 combinations of the cable type, cable length and the standard impedance (5×24×2=240) are available, 960 words can be omitted from the words stored in the form of the transfer function of $z^{-1}$ by storing words in the form of parameters of the CR ladder type circuit.

The original equivalent circuit with the hybrid transformer 11 used differs from that with the active hybrid circuit used in that the latter includes the resistor R1 and the capacitor C1 both forming the line terminating impedance. Thus, it is not necessary to separately store the parameters, so that the storage capacity necessary for storing such parameters can be reduced thereby increasing the overall storage capacity.

The digital balancing circuit 2 is used in common to the active hybrid circuit type and the hybrid transformer type. Thus, it is possible to reduce the size and cost of the hybrid circuit and thus the PCM channel unit. Further, when the active hybrid circuit is used, the return echo is roughly canceled by the bypass circuit 49 (FIG. 10), so that the occurrence of an overload of the A/D converter 51 can be prevented and the amount of operation in the digital balancing circuit 2 can be reduced.

The interpolation filter 3 or 20 has the function for compensating for the amplitude and phase characteristics of the echo return route, so that the phase equalizer and so on can be omitted and the amount of operation in the hybrid circuit can be reduced. As a result, it is possible to execute procedures for two channels by a single digital signal processor. Further, it is possible to compensate for the difference between the absolute delay times obtained with the active hybrid circuit and the hybrid transformer used by changing only some of the parameters of the interpolation filter 20, so that the hybrid circuit can be made compact.

The present invention is not limited to the specifically disclosed embodiments, and variations and modifications may be made without departing from the scope of the present invention.

What is claimed is:

1. A hybrid circuit, comprising:
   two-wire/four-wire conversion means for forming an interface between a two-wire line and a four-wire line, said four-wire line having a signal receiving terminal and a signal sending terminal; and
   digital balancing means, operatively connected to said two-wire/four-wire conversion means, for canceling a return echo passing through an echo return route including said two-wire/four-wire conversion means,
   said digital balancing means comprising:
   first means for determining values of elements of a ladder type circuit including resistors and capacitors, said ladder type circuit corresponding to an original equivalent circuit having an impedance obtained by viewing said two-wire line from said two-wire/four-wire conversion means;
   second means, operatively connected to said first means, for generating an impedance function of said original equivalent circuit in a form of a z function in accordance with a bilinear transform using an over-sampling frequency;
   third means, operatively connected to said second means, for generating filter coefficients of a digital filter by inserting said impedance function into a transfer function of said echo return route; and
   fourth means, connected to said third means including said digital filter, for generating, from a signal transferred via said signal receiving terminal, an echo cancel signal using said digital filter having the filter coefficients generated by said third means and for canceling said return echo using said echo cancel signal.

2. A hybrid circuit as claimed in claim 1, wherein:
   said two-wire/four-wire conversion means comprises an active hybrid circuit; and
   said hybrid circuit further comprises bypass means for generating a rough cancel signal from a cancel signal received via said signal receiving terminal and for roughly canceling said return echo using said rough cancel signal before said return echo is canceled by said fourth means.

3. A hybrid circuit as claimed in claim 2, wherein said bypass means includes a fixed gain defined as $\alpha \cdot R1/2$ where $\alpha$ is a constant having an admittance dimension, and R1 is a standard characteristic impedance of said active hybrid circuit.

4. A hybrid circuit as claimed in claim 1, wherein:
   said hybrid circuit further comprises an interpolation filter connected to said signal receiving terminal which receives a second signal transferred via said signal receiving terminal;
   said interpolation filter outputs a filtered output signal and has a filter transfer function in a bandpass range which matches with amplitude and phase characteristics of a part of said echo return route not including said two-wire/four-wire conversion means; and
   said filtered output signal of said interpolation filter is output to said fourth means.

5. A hybrid circuit as claimed in claim 4,
   wherein said two-wire/four-wire conversion means comprises one of a hybrid transformer and an active hybrid circuit, and
   wherein said interpolation filter comprises compensating means for compensating for an absolute delay difference between a first signal propagation time obtained when said two-wire/four-wire conversion means comprises the hybrid transformer and a second signal propagation time obtained when said two-wire/four-wire conversion means comprises the active hybrid circuit.

6. A hybrid circuit as claimed in claim 5, wherein:
   said interpolation filter has interpolation filter coefficients; and
   said interpolation filter coefficients of said interpolation filter are partially changed based on said absolute delay difference.

7. A hybrid circuit as claimed in claim 4, wherein said hybrid circuit further comprises:
   analog-to-digital conversion means, coupled to said signal sending terminal of said four-wire line, having first amplitude and first phase characteristics for converting a first analog signal generated from said two-wire/four-wire conversion means into a first digital signal; and
   digital-to-analog conversion means, coupled to said signal receiving terminal of said four-wire line, having second amplitude and second phase characteristics for converting a second digital signal into a second analog signal supplied to said two-wire/four-wire conversion means, and
   wherein the transfer function of said interpolation filter matches with the first and second amplitude and the first and second phase characteristics of said analog-to-digital conversion means and said digital-to-analog conversion means.

8. A hybrid circuit as claimed in claim 1, wherein said original equivalent circuit comprises:
   a first terminal and a second terminal;
   a series circuit including a first resistor and a first capacitor connected to said first resistor, said series circuit being connected between said first terminal and said second terminal;
   a second resistor having a first end connected to said first terminal, and a second end;
   a third resistor having a third end connected to said second end of said second resistor, and a fourth end;
   a second capacitor having a fifth end connected to the second end of said second resistor, and a sixth end connected to said second terminal; and
   a third capacitor having a seventh end connected to the fourth end of said third resistor, and an eighth end connected to said second terminal.

9. A hybrid circuit as claimed in claim 8, wherein said first resistor has an infinite resistance when said two-wire/four-wire conversion means comprises a hybrid transformer.

10. A hybrid circuit as claimed in claim 1,
   wherein one of said two-wire and four-wire lines transmits a line signal having a line frequency, and
   wherein said over-sampling frequency is an integer multiple of the line frequency of the line signal transmitted on one of said two-wire line and said four-wire line, and the integer multiple is larger than 1.

11. A hybrid circuit as claimed in claim 1, wherein said hybrid circuit is provided in a PCM channel unit.

12. A hybrid circuit as claimed in claim 1, wherein:
   said two-wire/four-wire conversion means comprises a hybrid transformer;
   said impedance function in the form of the z function represented by $It(z^{-1})$, is expressed according to:

$$It(z^{-1}) = (a0 + a1 \cdot z^{-1} + a2 \cdot z^{-2} + \ldots + am \cdot z^{-m})/(1 + b1 \cdot z^{-1} + b2 \cdot z^{-2} + \ldots + bm \cdot z^{-m})$$

where a0, a1, a2 ... am are m+1 first impedance coefficients and b1, b2, ... bm are m second impedance coefficients and $z^{-1}, z^{-2}, \ldots z^{-m}$ are m exponential operators:
   said third means comprises means for generating the filter coefficients including m+1 first filter coefficients A0, A1, A2, ..., Am and m second filter coefficients B1, B2, ..., Bm, m being an arbitrary number, where:

$$A0 = (k/4)((a0/R1) - 1)$$
$$A1 = (k/4)((a1/R1) - b1)$$
$$A2 = (k/4)((a2/R1) - b2)$$
$$\vdots$$
$$Am = (k/4)((am/R1) - bm)$$
$$B1 = k((a1/R1) + b1)$$
$$B2 = k((a2/R1) + b2)$$
$$\vdots$$
$$Bm = k((am/R1) + bm)$$
$$k = 1/(1 + (a0/R1)) \text{ and}$$

R1 is a standard characteristic impedance of said hybrid transformer; and
   said digital filter has a filter transfer function represented by $Ht(z^{-1})$ defined according to:

$$Ht(z^{-1}) = (A0 + A1 \cdot z^{-1} + A2 \cdot z^{-2} + \ldots + Am \cdot z^{-m})/(1 + B1 \cdot z^{-1} + B2 \cdot z^{-2} + \ldots + Bm \cdot z^{-m}).$$

13. A hybrid circuit as claimed in claim 1, wherein:
   said two-wire/four-wire conversion means comprises an active hybrid circuit;
   said impedance function in the form of the z function represented by $It(z^{-1})$, is expressed according to:

$$It(z^{-1}) = (a0 + a1 \cdot z^{-1} + a2 \cdot z^{-2} + \ldots + am \cdot z^{-m})/(1 + b1 \cdot z^{-1} + b2 \cdot z^{-2} + \ldots + bm \cdot z^{-m})$$

where a0, a1, a2 ... am are m+1 first impedance coefficients and b1, b2, ... bm are m second impedance coefficients and $z^{-1}, z^{-2}, \ldots z^{-m}$ are m exponential operators:
   said third means comprises means for generating m+1 of the filter coefficients A0, A1, A2, ..., Am, m being an arbitrary number, where:

$$A0 = \alpha \cdot a0$$
$$A1 = \alpha \cdot a1$$
$$A2 = \alpha \cdot a2$$
$$\vdots$$
$$Am = \alpha \cdot am$$
$$k = 1/(1 + (a0/R1))$$

α is a constant having an admittance dimension, and
   R1 is a standard characteristic impedance of said active hybrid circuit; and
   said digital filter has a filter transfer function represented by $Ht(z^{-1})$ defined according to:

$$Ht(z^{-1}) = (A0 + A1 \cdot z^{-1} + A2 \cdot z^{-2} + \ldots + Am \cdot z^{-m})/(1 + b1 \cdot z^{-1} + b2 \cdot z^{-2} + \ldots + bm \cdot z^{-m}).$$

14. A hybrid circuit as claimed in claim 1, wherein:
   said two-wire/four-wire conversion means comprises an active hybrid circuit;
   said impedance function in the form of the z function, represented by $It(z^{-1})$, is expressed according to:

$$It(z^{-1}) = (a0 + a1 \cdot z^{-1} + a2 \cdot z^{-2} + \ldots + am \cdot z^{-m})/(1 + b1 \cdot z^{-1} + b2 \cdot z^{-2} + \ldots + bm \cdot z^{-m})$$

where a0, a1, a2 ... am are m+1 first impedance coefficients and b1, b2, ... bm are m second impedance coefficients, and $z^{-1}, z^{-2}, \ldots z^{-m}$ are m exponential operators:
   said third means comprises means for generating m+1 of the filter coefficients A0, A1, A2, ..., Am, m being an arbitrary number, where:

$$A0 = \alpha(a0 - (R1/2))$$
$$A1 = \alpha(a1 - (R1/2)b1)$$
$$\vdots$$
$$Am = \alpha(am - (R1/2)/bm)$$

α is a constant having an admittance dimension, and
   R1 is a standard characteristic impedance of said active hybrid circuit; and
   said digital filter has a filter transfer function represented by $Ht(z^{-1})$ defined according to:

$$Ht(z^{-1})=(A0+A1\cdot z^{-1}+A2\cdot z^{-2}+\ldots +Am\cdot z^{-m})/(1+b1\cdot z^{-1}+b2\cdot z^{-2}+\ldots +bm\cdot z^{-m}).$$

15. A hybrid circuit cancelling a return echo, comprising:

one of an active hybrid circuit and a hybrid transformer; and common balancing means, connected to said one of the active hybrid circuit and the hybrid transformer, for generating a pseudo echo and canceling the return echo using said pseudo echo.

16. A hybrid circuit according to claim 15, wherein said common balancing means receives discrimination information indicating which of said one of the active hybrid circuit and the hybrid transformer is used.

17. A hybrid circuit according to claim 15, wherein said common balancing means comprises a ladder-type circuit having resistors and capacitors, and wherein one of said resistors is set to be infinite when said hybrid transformer is used and one of said capacitors is set to be zero when said hybrid transformer is used.

18. A hybrid circuit according to claim 17, wherein said ladder-type circuit is transformed into a Z domain function.

19. A hybrid circuit according to claim 17, wherein said ladder-type circuit includes three parameters, and wherein said common balancing means sets the three parameters to a first combination when said active hybrid circuit is used and sets the three parameters to a second combination when said hybrid transformer is used.

20. A hybrid circuit according to claim 15, wherein said common balancing means includes interpolation filter comprising one of a bandpass and lowpass filter operating at a frequency which is four times a sampling frequency.

21. A method of cancelling a return echo when one of an active hybrid circuit and a hybrid transformer is used, comprising the steps of:

(a) generating a pseudo echo using a common balancing circuit; and (b) cancelling the return echo using said pseudo echo.

22. The method according to claim 21, further comprising before said step (a), the step of receiving discrimination information indicating which of said one of the active hybrid circuit and the hybrid transformer is used.

23. The method according to claim 21, wherein said step (a) further comprises the step of generating a pseudo echo using a common balancing circuit comprising a ladder-type circuit having resistors and capacitors, and setting one of said resistors to be infinite when said hybrid transformer is used and setting one of said capacitors to be zero when said hybrid transformer is used.

24. A method according to claim 21, wherein said step (a) further comprises the step of transforming the ladder-type circuit into a Z domain function.

25. A method according to claim 23, wherein said ladder-type circuit includes three parameters, and wherein said step (a) further comprises the step of setting the three parameters to a first combination when said active hybrid circuit is used and sets the three parameters to a second combination when said hybrid transformer is used.

26. A method according to claim 21, wherein said step (a) further comprises the step of generating a pseudo echo using a common balancing circuit including an interpolation filter comprising a bandpass filter operating at a frequency which is four times a sampling frequency.

27. A method according to claim 21, wherein said step (a) further comprises the step of generating a pseudo echo using a common balancing circuit including an interpolation filter comprising a lowpass filter operating at a frequency which is four times a sampling frequency.

* * * * *

UNITED STATES PATENT AND TRADEMARK OFFICE
CERTIFICATE OF CORRECTION

PATENT NO. : 5,287,406
DATED : February 15, 1994
INVENTOR(S) : Mitsuo KAKUISHI It is certified that error appears in the above-identified patent and that said Letters Patent is hereby corrected as shown below:

Col. 1, line 60, delete "6" and substitute --65--.

Col. 6, line 54, after the last "R" delete -- - --;

line 60, delete " - " after -- 1 --.

Signed and Sealed this

Twenty-third Day of August, 1994

Attest:

BRUCE LEHMAN

Attesting Officer     Commissioner of Patents and Trademarks